(12) United States Patent
Vande Vrede

(10) Patent No.: US 10,524,431 B2
(45) Date of Patent: Jan. 7, 2020

(54) HYDROPONIC SYSTEMS AND METHODS FOR GROWING LIVE PRODUCE

(71) Applicant: Bryan Vande Vrede, Belvidere, NJ (US)

(72) Inventor: Bryan Vande Vrede, Belvidere, NJ (US)

( * ) Notice: Subject to any disclaimer, the term of this patent is extended or adjusted under 35 U.S.C. 154(b) by 523 days.

(21) Appl. No.: 14/334,809

(22) Filed: Jul. 18, 2014

(65) Prior Publication Data

US 2016/0014986 A1    Jan. 21, 2016

(51) Int. Cl.
*A01G 31/00*    (2018.01)

(52) U.S. Cl.
CPC ................... *A01G 31/00* (2013.01)

(58) Field of Classification Search
USPC ... 47/59 R, 62 R, 63, 56, 74, 73, 64, 60, 61, 47/65, 5, 65.8, 66.5, 84, 66.7
See application file for complete search history.

(56) References Cited

U.S. PATENT DOCUMENTS

| | | | |
|---|---|---|---|
| 3,973,355 A * | 8/1976 | McKenzie ........... | A01G 9/1086 47/57.6 |
| 4,075,785 A * | 2/1978 | Jones .................. | A01G 31/06 47/62 A |
| 4,189,868 A | 2/1980 | Tymchuck et al. | |
| 4,407,092 A * | 10/1983 | Ware ..................... | A01G 31/02 47/64 |
| 5,097,627 A * | 3/1992 | Roberts ............... | A01G 31/045 47/62 R |
| 5,171,683 A * | 12/1992 | Kertz .................... | A01G 31/04 435/297.1 |

(Continued)

FOREIGN PATENT DOCUMENTS

EP    1197137 A1 *    4/2002    ............... A01G 9/10

OTHER PUBLICATIONS

How do you properly seed a rockwool cube? jclagreca Jun. 20, 2008, Retrieved from internet Oct. 16, 2017 [http://forums.gardenweb.com/discussions/1992772/how-do-you-properly-seed-a-rockwool-cube] 3 pages.*

(Continued)

*Primary Examiner* — Andrea M Valenti
(74) *Attorney, Agent, or Firm* — Doherty IP Law Group LLC

(57) ABSTRACT

A method of providing packaged, live produce includes providing a plurality of seeds for different plant species, providing a foam growing media, inserting at least one of each type of seed for the different plant species into the foam growing media, growing the seeds inserted into the foam growing media to provide a young rooted plant having roots projecting from the foam growing media and having leaves from the different plant species, and transferring the young rooted plant including the foam growing media to a hydroponic system for producing a fully grown plant having the roots projecting from the foam growing media. While leaving the roots projecting from the foam growing media, the fully grown plant is removed from the hydroponic system and placed in a package having a fluid reservoir. When disposed inside the package, the roots of the fully grown plant are in communication with the fluid reservoir.

20 Claims, 25 Drawing Sheets

(56) References Cited

U.S. PATENT DOCUMENTS

| | | | | |
|---|---|---|---|---|
| 5,590,490 | A * | 1/1997 | Kikuchi | G05D 11/138 47/59 R |
| 6,357,207 | B1 * | 3/2002 | Weder | B65B 25/023 206/423 |
| 6,381,901 | B1 * | 5/2002 | Friedman | A01G 9/028 206/752 |
| 7,891,134 | B2 * | 2/2011 | Wismans | A01G 1/00 47/66.7 |
| 8,136,294 | B2 | 3/2012 | Wismans | |
| 8,220,201 | B2 | 7/2012 | Wismans | |
| 8,365,466 | B1 | 2/2013 | Storey | |
| 2005/0102895 | A1 * | 5/2005 | Bissonnette | A01H 4/001 47/57.6 |
| 2006/0185235 | A1 * | 8/2006 | Bono | A01C 1/044 47/56 |
| 2009/0019765 | A1 * | 1/2009 | Kosinski | A01G 9/1086 47/64 |
| 2011/0031154 | A1 * | 2/2011 | Overgaag | B65D 21/022 206/509 |
| 2011/0203944 | A1 * | 8/2011 | Singer | B65D 31/06 206/204 |
| 2012/0054061 | A1 * | 3/2012 | Fok | A01G 31/00 705/26.5 |
| 2012/0240464 | A1 * | 9/2012 | Klemm | A01G 9/045 47/66.7 |
| 2015/0027049 | A1 * | 1/2015 | Bijl | A01G 9/10 47/66.7 |
| 2015/0156973 | A1 * | 6/2015 | Prinster | A01G 9/102 47/65.7 |
| 2015/0313093 | A1 * | 11/2015 | Brot | B65D 85/52 206/423 |
| 2015/0342133 | A1 * | 12/2015 | Nakajima | A01G 31/02 47/62 R |

OTHER PUBLICATIONS

Growing Onions in Clusters—The Easy Way to Grow from Seed, by Benedict Vanheems, Dec. 23, 2011, 8 pages retrieved from internet May 21, 2018 [https://www.growveg.com/guides/growing-onions-in-clusters-the-easy-way-to-grow-from-seed/].*

Is it better to plant many seeds in one hole or few? User3084006 and btspierre, Jan. 2014, 4 pages retrieved from internet May 21, 2018 [https://gardening.stackexchange.com/questions/8820/is-it-better-to-plant-many-seeds-in-one-hole-or-few].*

Easy Seed Germination with Polyurethane Foam, Feb. 20, 2009, 7 pages retrieved from internet May 21, 2018 [http://scienceinhydroponics.com/2009/02/easy-seed-germination-with-polyurethane-foam.html].*

How to Grow Hydroponic—Step by Step Tutorial, 5 pages, Mar. 13, 2014, retrieved from internet May 21, 2018 [http://zerosoilgardens.com/how-to-grow-hydroponic-step-by-step-tutorial/].*

Grow Lettuce from Seed, by Ruth Dobsevage, Nov. 11, 2009, retrieved from internet May 21, 2018 [http://www.vegetablegardener.com/item/3911/grow-lettuce-from-seed].*

Texas Gardener, Lettuce from seed to Harvest, by Skip Richter, 5 pages Jan./Feb. 2007, retrieved from internet May 21, 2018, [http://www.texasgardener.com/pastissues/janfeb07/Lettuce.html].*

Small-Scale Lettuce Production with Hydroponics or Aquaponics, College of Tropical Agriculture and Human Resources University of Hawaii at Manoa, By Harry Ako and Adam Baker, Sustainable Agriculture, Oct. 2009, SA-2, pp. 1-7.*

Oasis Horticubes Growing Medium, Smithers-Oasis Company, Kent, Ohio, 2011, 2 pages.

Hollandia Produce Lettuce and Leafy Greens, Hollandia Produce, 2014, 2 pages.

Living 3-In-1 Lettuce, Absolutely Fresh Because It's Still alive!, Hollandia Produce, 2014, 2 pages.

* cited by examiner

HYDROPONIC SYSTEMS AND METHODS FOR GROWING LIVE PRODUCE

BACKGROUND OF THE INVENTION

Field of the Invention

The present application is directed to produce and is more specifically related to hydroponic systems and methods for producing live, fresh produce.

Description of the Related Art

Plants absorb essential mineral nutrients from inorganic ions present in water. In natural conditions, soil acts as a mineral nutrient reservoir, however, the soil itself is not essential to plant growth. When the mineral nutrients present in soil dissolve in water, plant roots are able to absorb the mineral nutrients so that soil is no longer required for the plant to thrive. The science of growing plants by using mineral nutrient solutions in water, without soil, is commonly referred to as Hydroponics.

Recently, there have been some efforts directed to selling fresh produce in stores with the roots intact. As a result, the produce remains "alive" after packaging, during shipment, and during storage on store shelves. For example, Hollandia Produce LP of Carpinteria, Calif., has developed a family of produce, sold under the mark Our Live Gourmet®. The produce is harvested with the roots intact, and the produce is packaged in see-through clamshells that function as mini-greenhouses. The intact roots draw water from a water reservoir provided inside the package. As living plants, these products have long-lasting freshness, and retain flavor and color much longer than other products found in the produce department.

In spite of the above advances, there remains a need for living produce having different types of leaves, which may be used for making mixed salads. There also remains a need for improved hydroponic systems and methods for growing live produce having different types of leaves for making mixed salads.

SUMMARY OF THE INVENTION

In one embodiment, a method of providing packaged, live produce includes providing a plurality of seeds for different plant species, providing a foam growing media, inserting at least one of each type of the seeds for the different plant species into the foam growing media, growing the seeds inserted into the foam growing media to provide a young rooted plant comprising the different plant species, and transferring the young rooted plant including the foam growing media to a hydroponic system for producing a fully grown plant having roots projecting from the foam growing media. While leaving the roots projecting from the foam growing media, the fully grown plant is desirably removed from the hydroponic system and placed in a package having a fluid reservoir with the roots of the fully grown plant in communication with the fluid reservoir.

In one embodiment, the seeds may be seeds used to grown green leaf lettuce, red leaf lettuce, red oak leaf lettuce, Bibb lettuce, green oak leaf lettuce, romaine lettuce, Jericho lettuce, and outrageous red romaine lettuce.

In one embodiment, the foam growing media preferably includes low density, high-drainage foam growing media. The foam growing media may include a foam mat having an array of seeding cubes. In one embodiment, the seeding cubes are separated from one another by score lines that define thinner sections of the foam mat. The seeding cubes are desirably separable from one another at the score lines. The foam mat may have about 50-300 of the seeding cubes, which are separated from one another by the score lines. In one embodiment, each seeding cube desirably has a top surface with an opening formed in the top surface. The seeds are preferably inserted into the openings formed in the top surfaces of the seeding cubes.

In one embodiment, the hydroponic system desirably includes a water source for providing water to the hydroponic system, a fertilizer source for dispensing fertilizer into the water, an acid source for controlling the pH level of the water, and a controller for monitoring the level of the fertilizer in the water and adjusting the pH level of the water for optimizing plant growth. The hydroponic system may also include a thermometer for measuring ambient temperature. The controller preferably adjusts the level of the fertilizer in the water in response to the measured levels of fertilizer in the water.

In one embodiment, a method of providing packaged, live produce includes providing a hydroponic system including a water source for providing water to the hydroponic system, a fertilizer source for dispensing fertilizer into the water, an acid source for controlling the pH level of the water, and a controller for monitoring the level of the fertilizer in the water and adjusting the pH level of the water. The method desirably includes providing at least five different types of seeds different plant species, providing a foam growing media, inserting at least one of each type of the seeds for the different plant species into the foam growing media, growing the seeds inserted into the foam growing media to provide a young rooted plant comprising the different plant species, and transferring the young rooted plant including the foam growing media to the hydroponic system for producing a fully grown plant having roots projecting from the foam growing media. In one embodiment, while leaving the roots projecting from the foam growing media, the fully grown plant is removed from the hydroponic system and placed in a package having a fluid reservoir. The roots of the fully grown plant preferably remain in communication with the fluid reservoir after being placed in the package.

In one embodiment, a method of providing packaged, live produce desirably includes providing different types of seeds for different plant species, providing a foam growing media having an array of seeding cubes, inserting one of each type of the seeds into each of the seeding cubes, growing the seeds inserted into the seeding cubes to provide young rooted plants, each young rooted plant having the different plant species, and transferring the young rooted plants including the seeding cubes to a hydroponic system for producing fully grown plants having roots projecting from the seeding cubes. In one embodiment, while leaving the roots projecting from the seeding cubes, the fully grown plants are removed from the hydroponic system and placed in packages having fluid reservoirs, whereby the roots of the fully grown plants are in communication with the fluid reservoirs for providing fluid to the fully grown plants while the fully grown plants are in the packages.

These and other preferred embodiments of the present invention will be described in more detail below.

DETAILED DESCRIPTION

Figure 1:
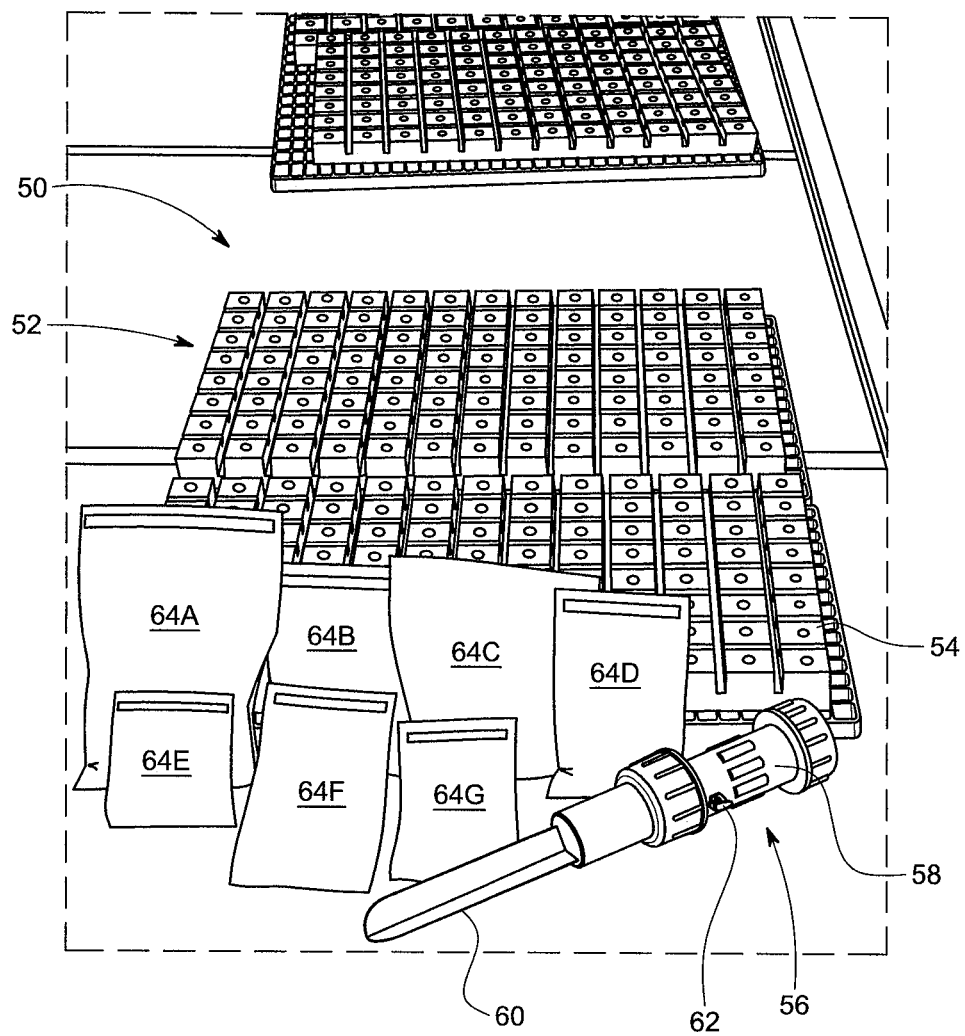
FIG. 1 shows a system for growing live produce including seeding mats, each seeding mat having a plurality of seeding cubes, a plurality of seed packets, each seed packet containing a different type of seed that is placed into the seeding cubes, and a hand-held seeding tool, in accordance with one embodiment of the present invention.

Referring to FIG. 1, in one embodiment, a hydroponic system 50 for growing live produce preferably includes seeding mats 52 having a plurality of seeding cubes 54 that may be separated from one another by score lines, rows and/or columns into individual seeding cubes. In one embodiment, the seeding mat 52 may be a foam media such as a dense, foam media sold by Smithers-Oasis North America of Kent, Ohio, under the trademarks OASIS®, HORTICUBES®, and ROOTCUBES®. In one embodiment, the seeding cubes may be enriched with nutrients that facilitate growing plants.

In one embodiment, the hydroponic system 50 preferably includes a hand-held seeding tool 56 having a handle 58 at a proximal end, a seed trough 60 at a distal end, and a control button 62 for activating the tool 56. In one embodiment, the elongated seed trough desirably has a V-shaped cross-section that is adapted to hold a plurality of seeds. In one embodiment, the control button 62 is engaged for activating the hand-held seeding tool 56 for vibrating the seed trough 60 for dispensing the seeds one at a time from the distal end of the seed through.

Referring to FIG. 1, in one embodiment, the hydroponic system 50 preferably includes a plurality of seed packets 64A-64G, each seed packet containing a different type of seed. In one embodiment the first seed package 64A contains green leaf lettuce seeds, the second seed packet 64B contains red leaf lettuce seeds, the third seed packet 64C contains red oak leaf lettuce seeds, the fourth seed packet 64D contains Bibb lettuce seeds, the fifth seed packet 64E contains green oak leaf lettuce seeds, the sixth seed packet 64F contains Jericho lettuce seeds, and the seventh seed packet 64G contains outrageous red Romaine lettuce seeds. Although seven seeds packets for seven different types of lettuce are shown in FIG. 1, other preferred systems may use more or less types of seeds, whereby each type of seed packet contains a different type of seed.

Figure 2:
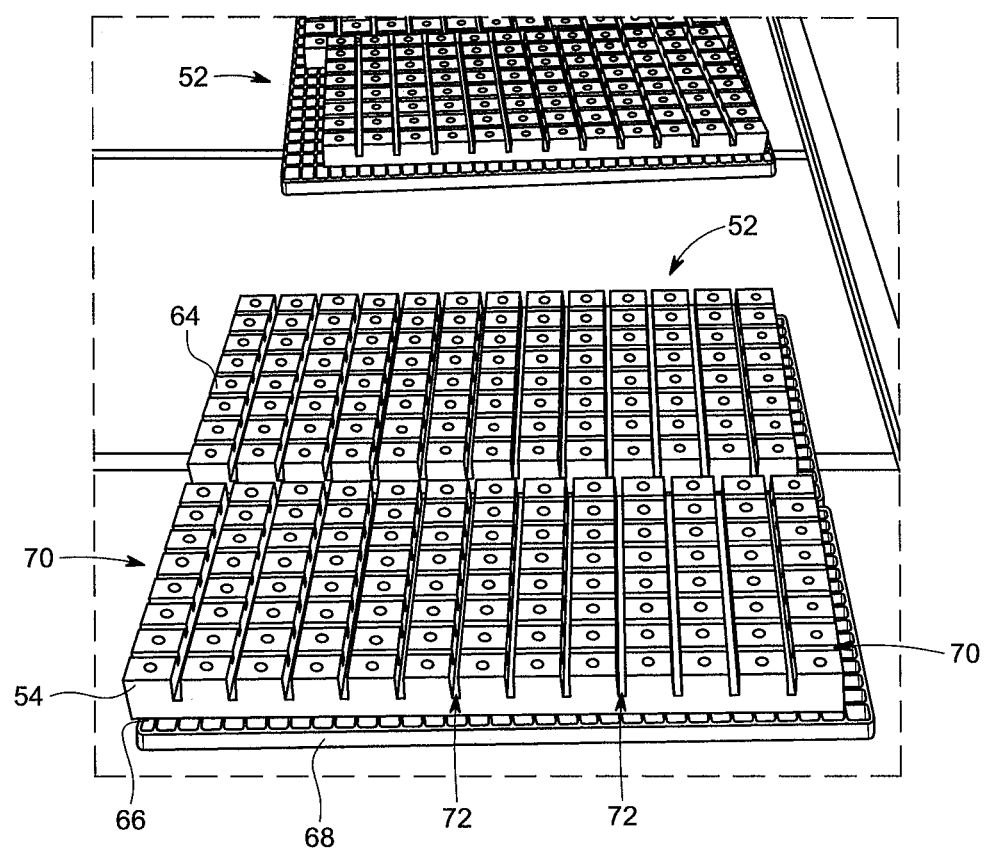
FIG. 2 shows a top perspective view of the seeding mats shown in FIG. 1.
Figure 3:
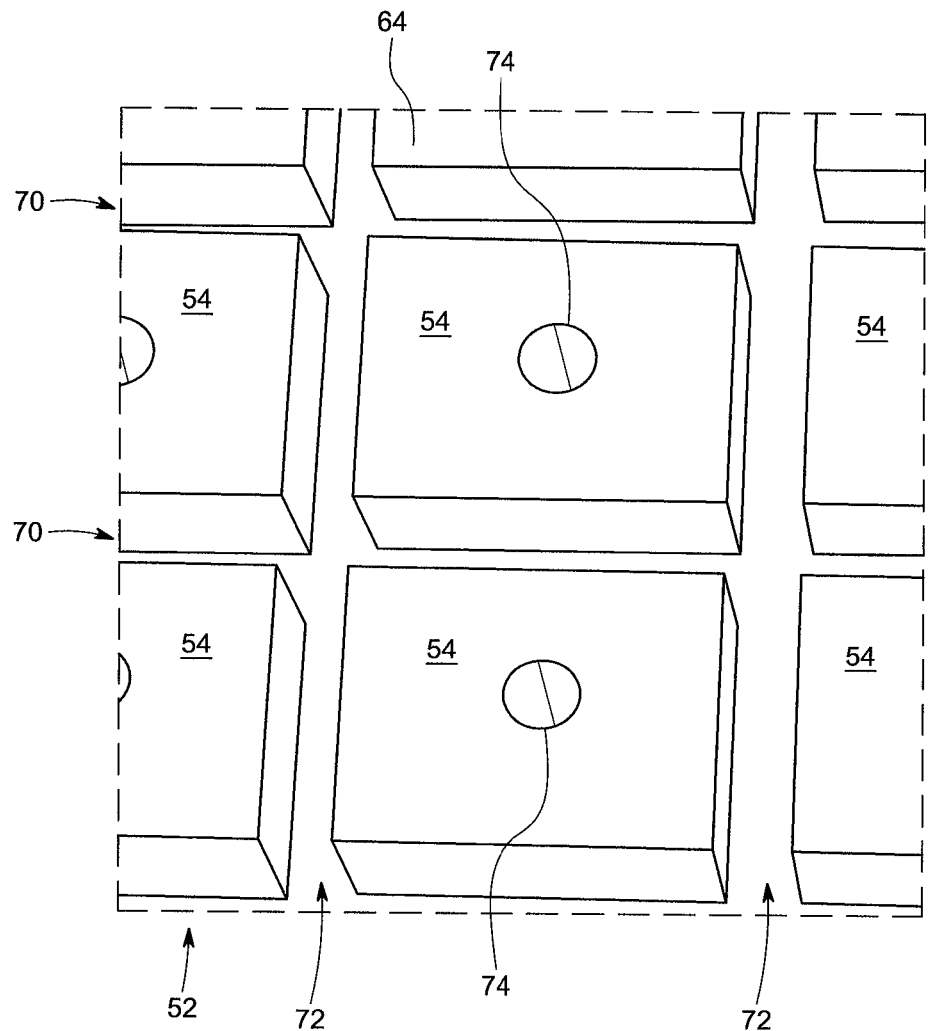
FIG. 3 shows a magnified top perspective view of some of the seeding cubes shown in FIGS. 1-2.

Referring to FIG. 2, in one embodiment, each seeding mat 52 preferably has a top surface 64 and a bottom surface 66 opposite the top surface that is supported by a tray 68 that provides stability for the seeding mat 52. Referring to FIGS. 2 and 3, in one embodiment, the seeding mat 52 has 104 individual seeding cubes 54 are separated from one another by horizontally extending rows 70 and vertically extending columns 72. In one embodiment, the rows and columns function as score lines that define thinner sections of the seeding mat 52 for enabling the individual seeding cubes 54 to be separated from one another, such as by cutting or tearing the individual seeding cubes from the seeding mat 52.

Referring to FIG. 3, in one embodiment, each seeding cube 54 desirably includes a blind opening 74 that is adapted to receive one or more seeds. In one embodiment, the blind opening 74 is a centrally located opening that is accessible at the top surface 64 of the seeding mat. Water may be sprayed or dispensed over the top surface of the seeding mat to provide water for the seeds and growing plants. In one embodiment, when one or more seeds are inserted into an opening, the seeds fall into the bottom of the blind opening 74 for receiving water and/or nutrients from the foam media that surrounds the seeds. The foam media also desirably enables air to pass therethrough for providing oxygen to the seeds.

Figure 4:
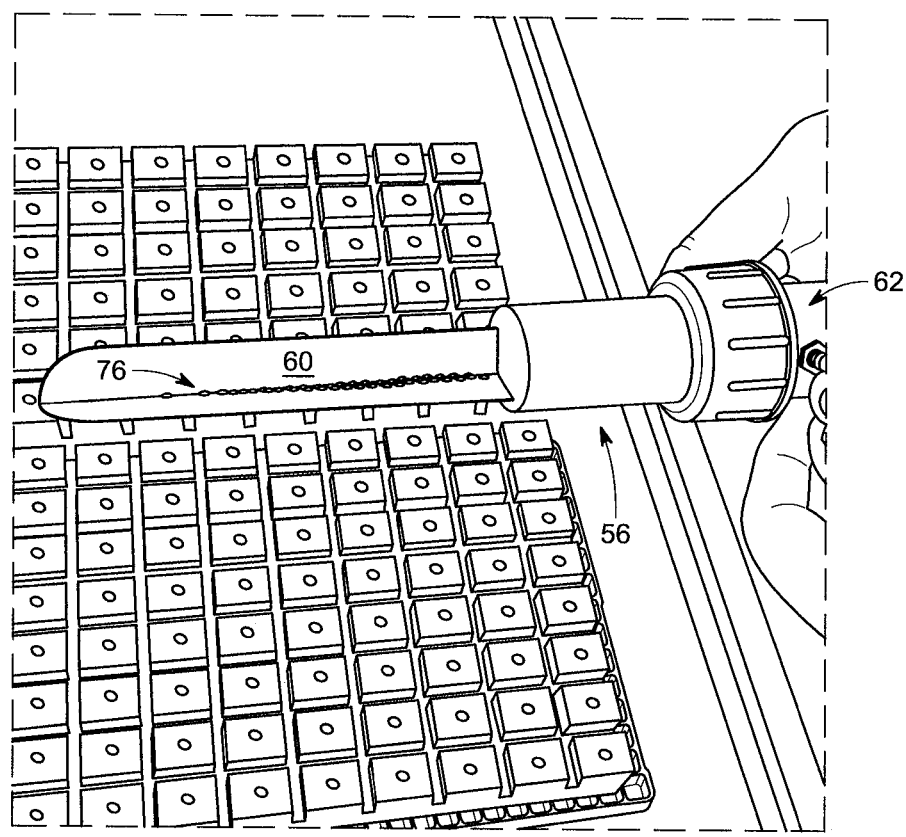
FIG. 4 shows two seeding mats and the hand-held seeding tool of FIG. 1, with seeds loaded onto a seeding trough of the seeding tool, in accordance with one embodiment of the present invention.
Figure 5:
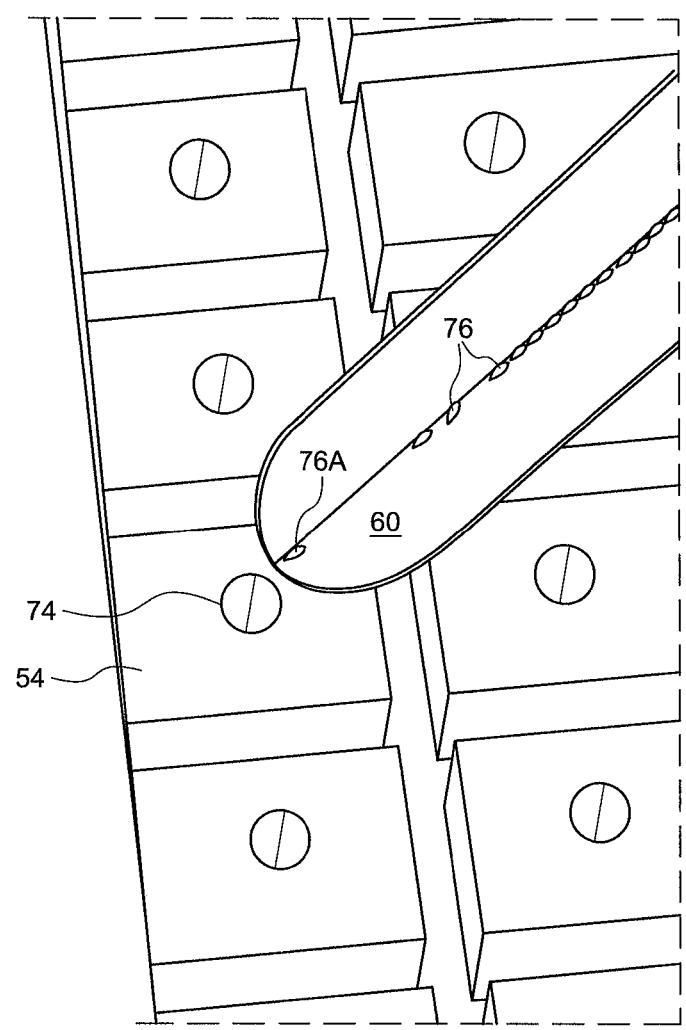
FIG. 5 shows a method of using the hand-held seeding tool of FIG. 4 to insert seeds into openings in the seeding cubes of FIGS. 1-4, in accordance with one embodiment of the present invention.

Referring to FIG. 4, in one embodiment, a plurality of seeds 76 are loaded onto the seed trough 60 of the hand-held seeding tool 56. The control button 62 on the handle 58 of the tool 56 is engaged for activating the seeding tool 56, which preferably vibrates the seed trough 60 for advancing the individual seeds 76 toward the distal end of the seed trough 60. FIG. 5 shows the distal end of the seed trough 60 aligned with a central opening 74 of a seed cube 54. A leading seed 76A is vibrated toward the distal end of the seed trough 60 for being inserted into the opening 74 of the seed cube. In one embodiment, the process is completed until a single seed of a particular type of lettuce (e.g., green leaf lettuce) has been inserted into each opening 74 on each seed cube 54. In one embodiment, it may be desirable to place two or more seeds of a particular type of lettuce into each opening. In one embodiment, the process is completed for the seven types of lettuce seed packets shown above in FIG. 1 so that seven different types of seed have been placed into each opening 74 of each seed cube 54. It is contemplated that other combinations, types, and/or numbers of seeds may be utilized and still fall within the scope of the present invention.

Figure 6:
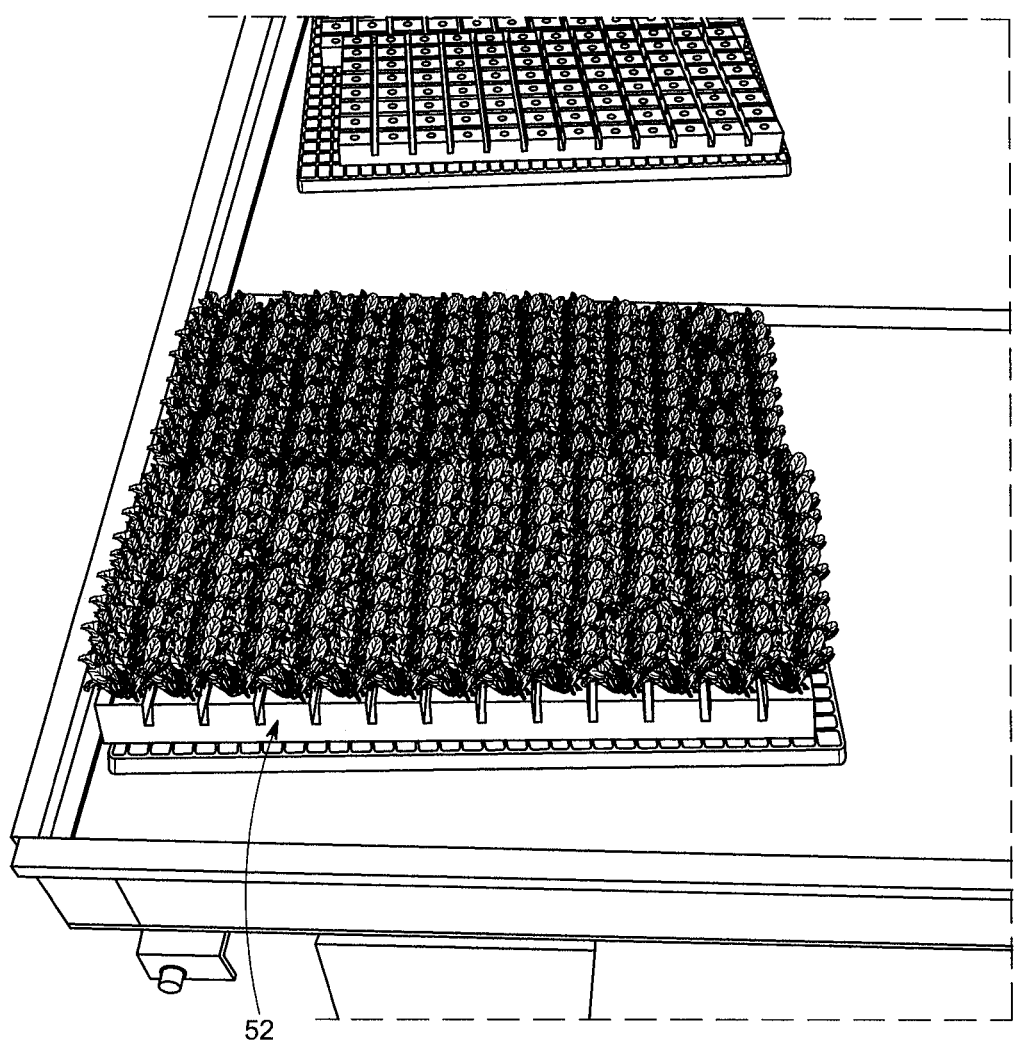
FIG. 6 shows young plants grown on the seeding mats shown in FIGS. 1-4.

Referring to FIG. 6, in one embodiment, either before or after the seeds have been placed into the openings 74 of the seed cubes 54 (FIGS. 4 and 5), the seed mat 52 is "watered" by spraying water or a solution including water and nutrients over the top surface of the seed mat 52. The seed mat 52 preferably holds the solution to provide moisture for the planted seeds. In one embodiment, the seed mat 52 is watered twice per day for two weeks to produce the young plants shown in FIG. 6. The frequency of watering may be modified in response to various factors including weather conditions. After two weeks, the seed cubes holding the young plants are ready to be divided from one another for being transplanted to gutters as will be described in more detail herein. In one embodiment, the seed cubes are preferably divided from one another along the rows, columns and/or score lines provided on the seed mats. Each seed cube may have a plurality of plants growing thereon, such as seven or more different plants growing in a single seed cube.

Figure 7:
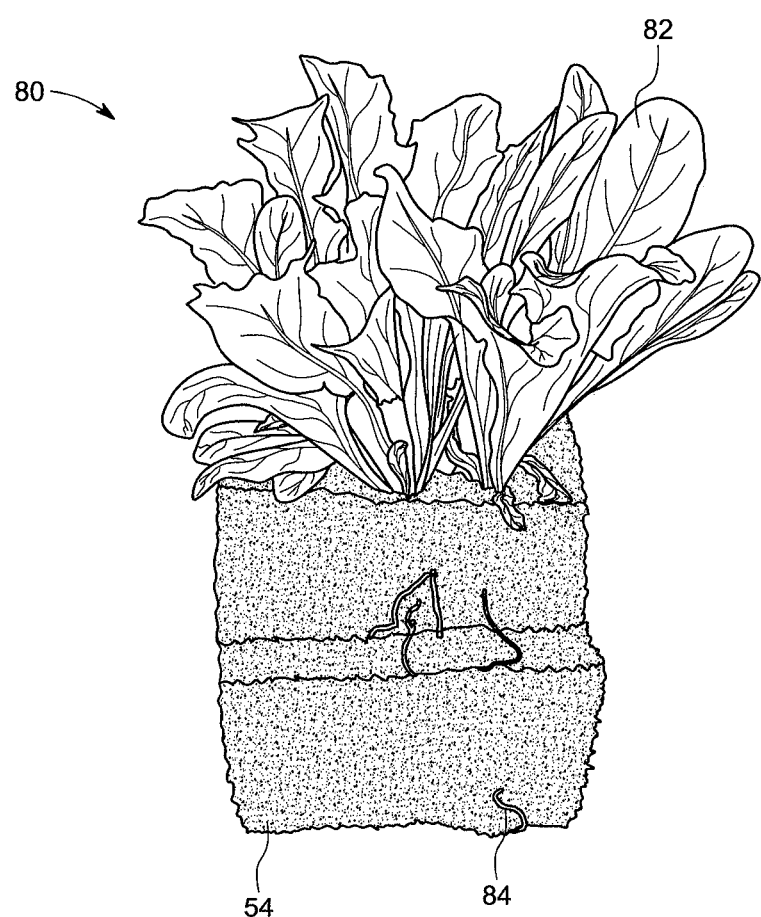
FIG. 7 shows a top perspective view of a single seeding cube having a plurality of plants, in accordance with one embodiment of the present invention.
Figure 8:
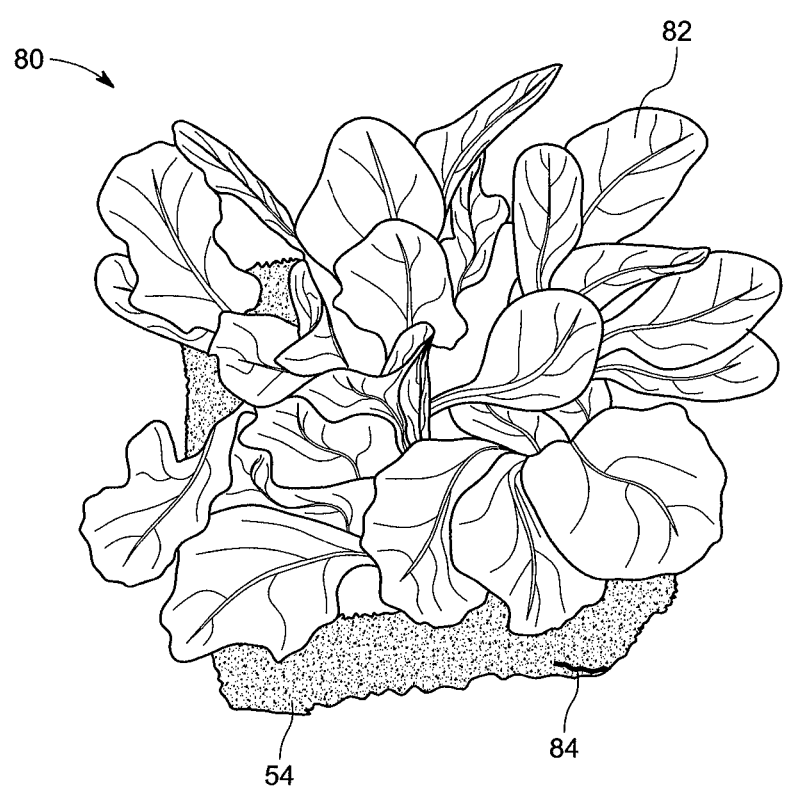
FIG. 8 shows a top plan view of the single seeding cube shown in FIG. 7.
Figure 9:
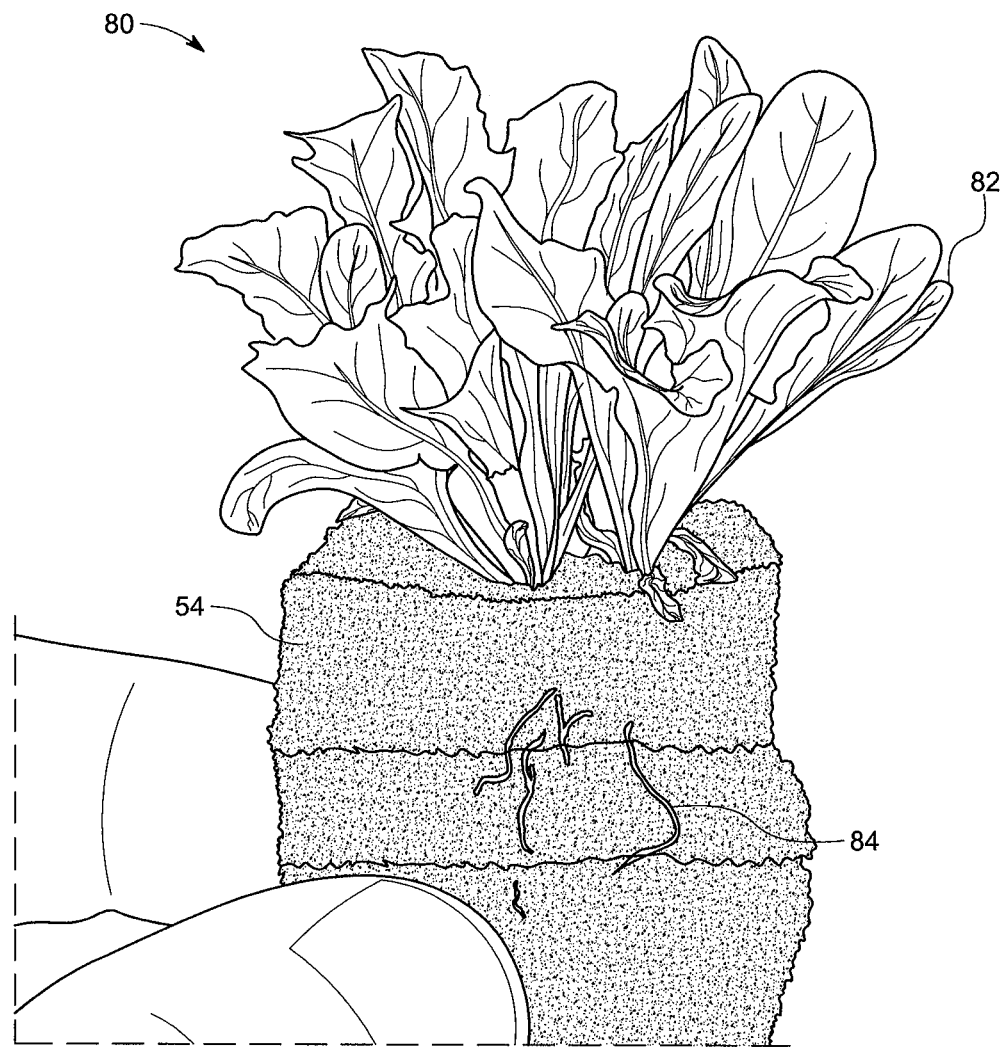
FIG. 9 shows a side elevation view of the single seeding cube shown in FIGS. 7 and 8.

Referring to FIGS. 7-9, in one embodiment, the seed cubes 54 including the young plant 80 are separated from the seed mat 52 shown in FIG. 6. The separated seed cubes 54 desirably include a plurality of young plant 80 having leaves 82 projecting from the top surface of the seed cube 54 and roots 84 that project from the sides and the bottom of the seed cube 54. In one embodiment, each seed cube may have a plurality of young plants having leaves from various plants. In FIG. 9, the seed cube has red leaves, oak leaves and Romaine leaves growing therefrom. In one embodiment, a single seed cube may have seven or more different types of lettuce leaves.

Figure 10:
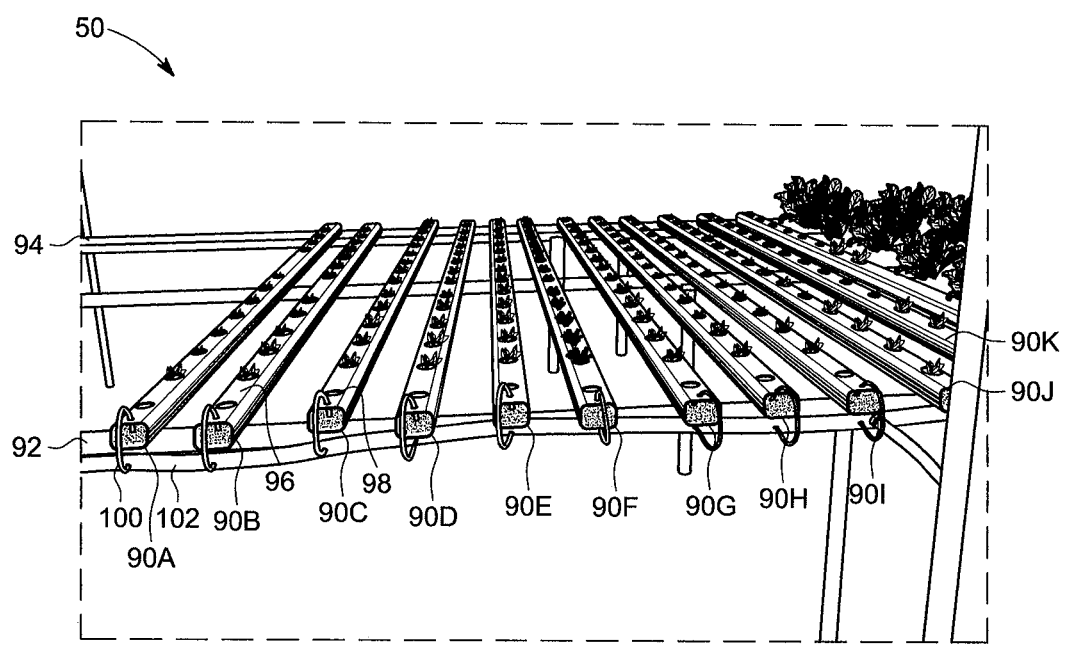
FIG. 10 shows an end view of a hydroponic system for growing plants, the hydroponic system including a series of gutters, in accordance with one embodiment of the present invention.

Referring to FIG. 10, in one embodiment, the hydroponic system 50 desirably includes a series of gutters 90A-90K having upstream ends 92 and downstream ends 94. The gutters 90A-90K are desirably spaced from one another and slope downwardly between the upstream ends and the downstream ends so that water directed into the upstream ends flows toward the downstream ends. The top surface 96 of each of the gutters 90 preferably includes openings 98 that are spaced from one another along the length of the gutters, whereby each opening 98 is adapted to receive one of the seed cubes with a plurality of young plants shown in FIGS. 7-9. The hydroponics system preferably operates continuously, twenty-four (24) hours per day. As such, after being placed into the openings, the seed cubes and the young plants are continuously provided with water and fertilizer to grow the young plants into fully grown, adult plants.

In one embodiment, the hydroponic system 50 desirably includes a main water line 100 that provides water to the upstream, proximal ends 92 of the gutters 90. A series of feeding tubes 102 transfer water from the main water line 100 to the proximal ends of each of the gutters 90A-90K. The water from the feeding tubes 102 flows between the proximal ends and the distal ends of the gutters 90A-90K to provide water and fertilizer to the seed cubes containing the plurality of young plants.

Figure 11:
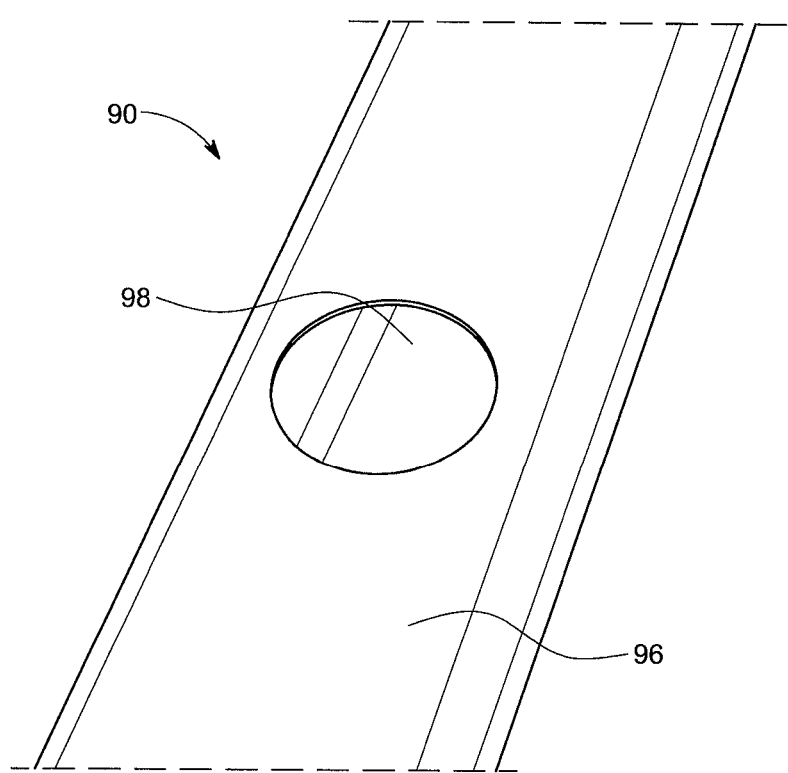
FIG. 11 shows a top perspective view of one of the gutters shown in FIG. 10, the gutter having a plant opening for receiving a plant.
Figure 12:
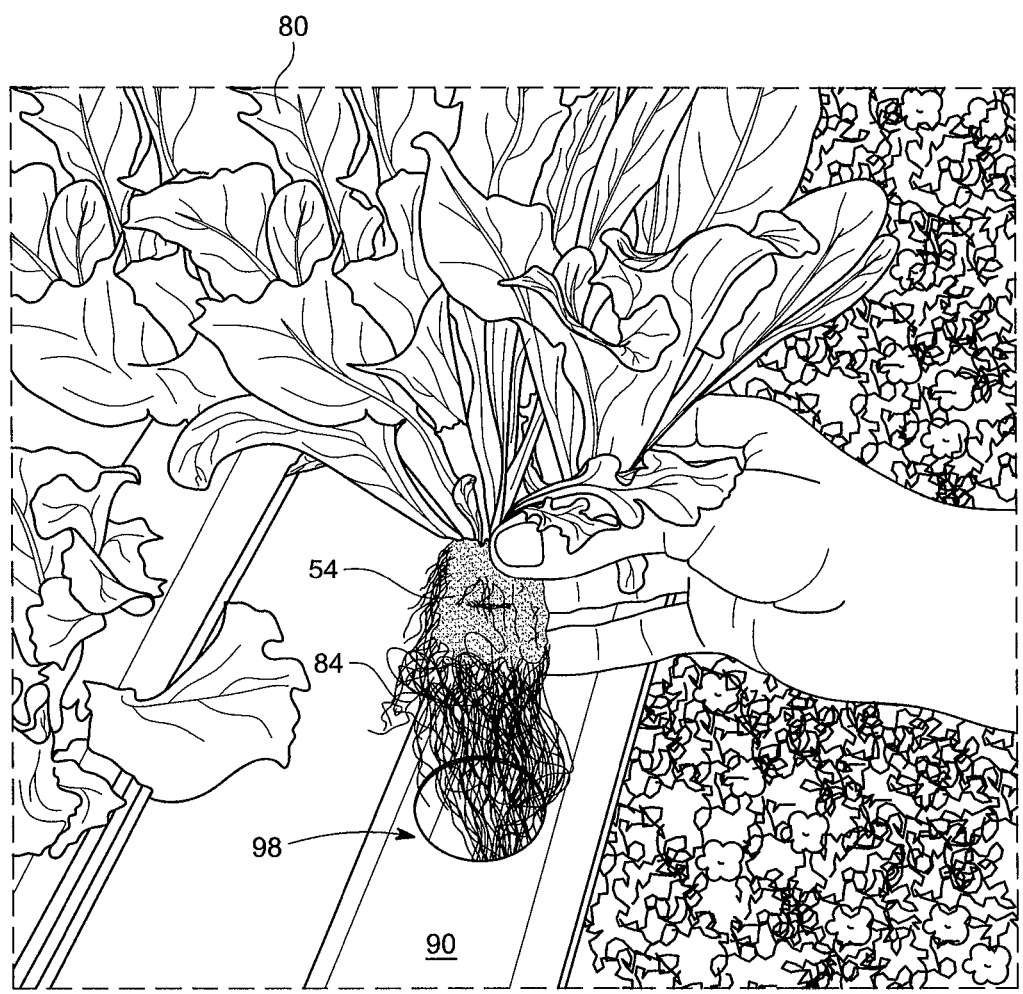
FIG. 12 shows a plant having roots and a seeding cube, the plant being removed from a plant opening of a gutter.

Referring to FIG. 11, in one embodiment, a gutter 90 preferably includes a top surface 96 having at least one plant opening 98 formed therein. Referring to FIG. 12, in one embodiment, a plant 80 including a seed cube 54 with roots 84 projecting from the seed cube is inserted into the plant opening 98. The roots 84 draw the water flowing through the gutter 90 into the plant 80. In one embodiment, a single plant is preferably inserted into each of the plant openings of the gutter 90.

Figure 13:
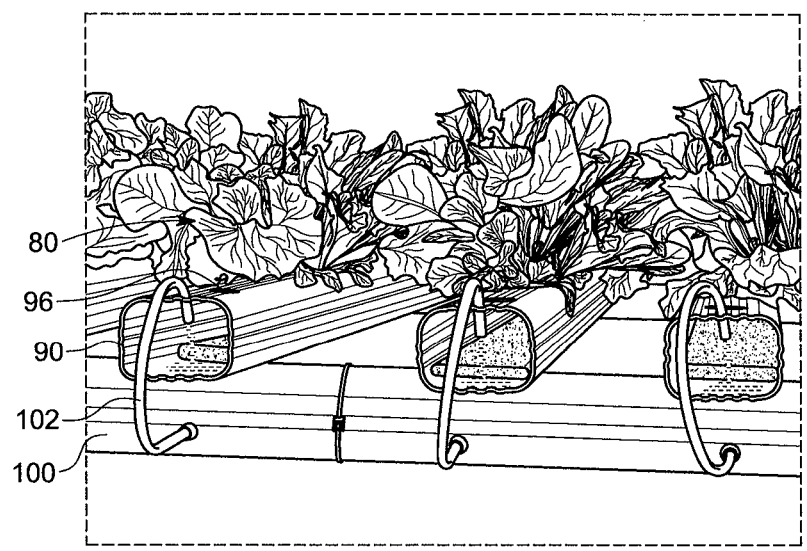
FIG. 13 shows a magnified view of the end of the hydroponic system shown in FIG. 10, in accordance with one embodiment of the present invention.
Figure 14:
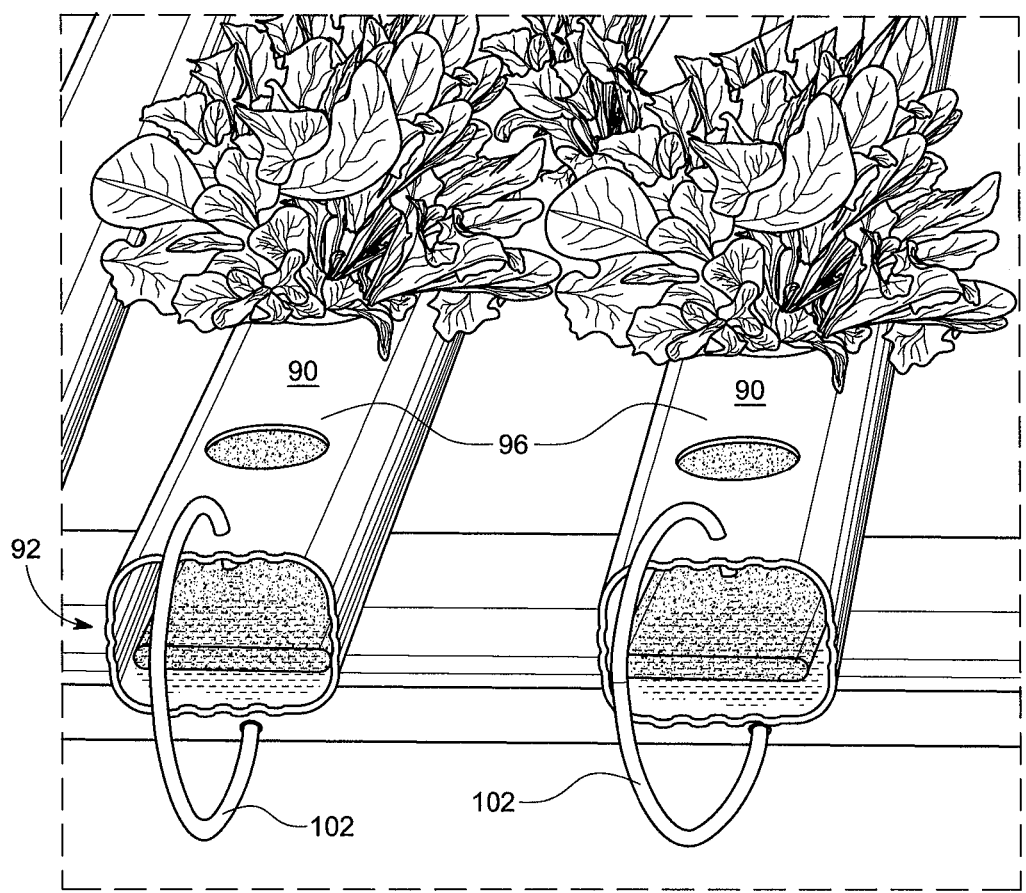
FIG. 14 shows a perspective view of the end of the hydroponic system shown in FIG. 13.
Figure 15:
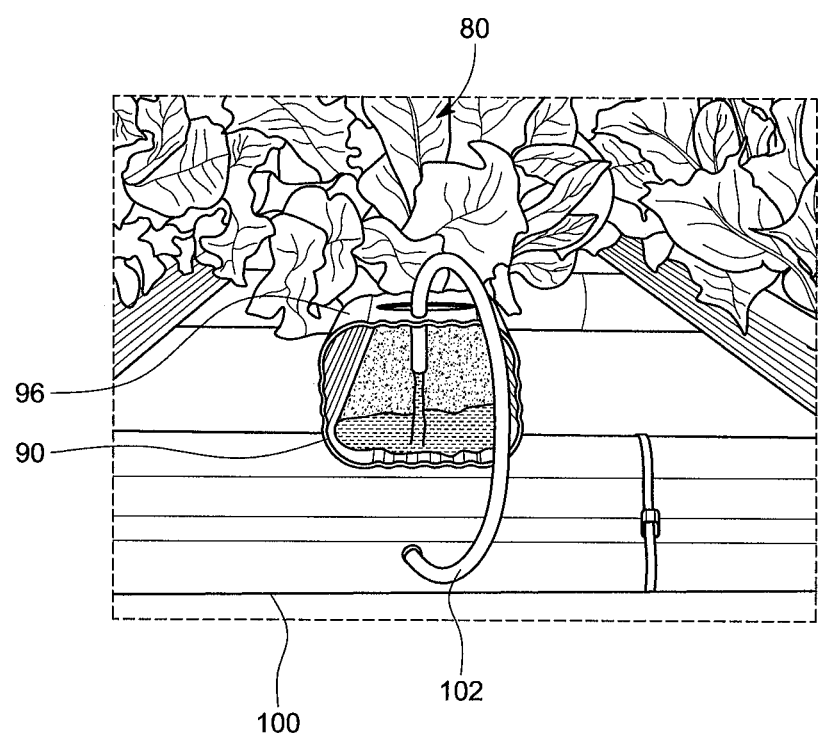
FIG. 15 shows an elevation view of the end of a single gutter of the hydroponic system shown in FIGS. 13 and 14.

Referring to FIGS. 13-15, in one embodiment, the main water line 100 extends along the proximal ends 92 of the gutters 90. The feeding tubes 102 have proximal ends in fluid communication with the main water line 100 and distal ends that pass through feeding tube openings formed in the top surfaces 96 of the respective gutters 90. The water discharged from the distal ends of the feeding tubes 102 flows from the proximal ends to the distal ends of the gutters to 90 to provide water and nourishment for the plants 80 that have been disposed within the plant openings of the gutters.

After the seed cubes containing the young plants are inserted into the respective plant openings of the gutters, the plants are supplied with water, nutrients, and light for about four weeks until they are fully grown.

Figure 16:
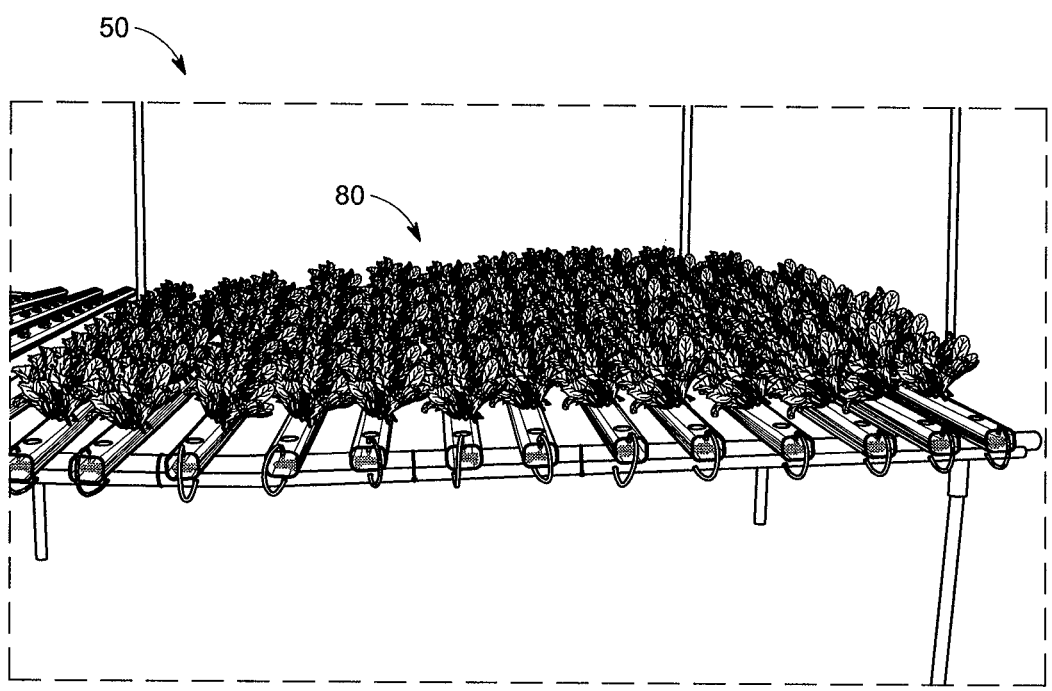
FIG. 16 shows an end view of a section of a hydroponic system having fully grown plants, in accordance with one embodiment of the present invention.
Figure 17:
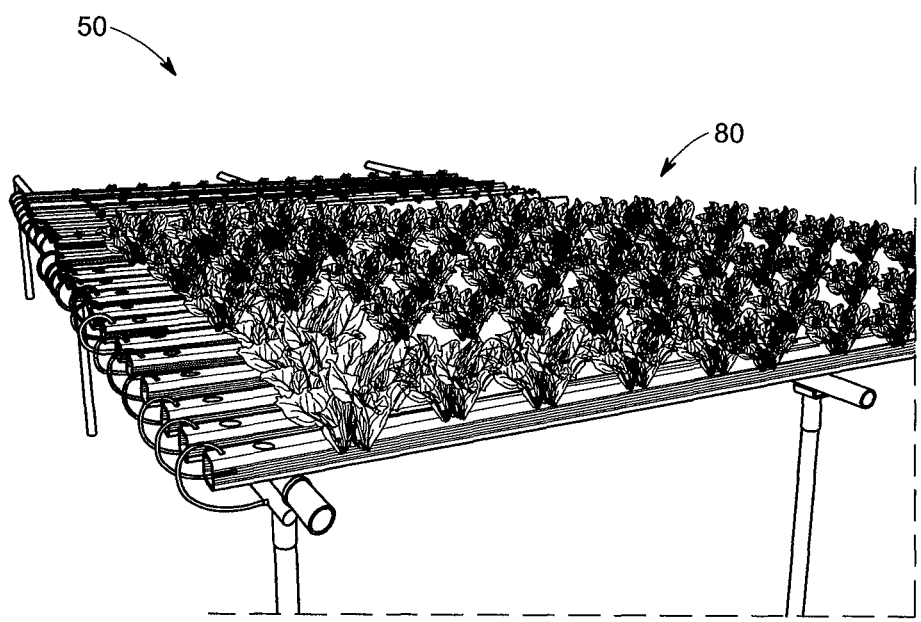
FIG. 17 shows a front view of the hydroponic system shown in FIG. 16.

FIG. 16 shows an end of a section of a hydroponic system 50 having fully grown plants 80. FIG. 17 shows a front view of the hydroponic system 50 of FIG. 16 including the fully grown plants 80.

Figure 18:
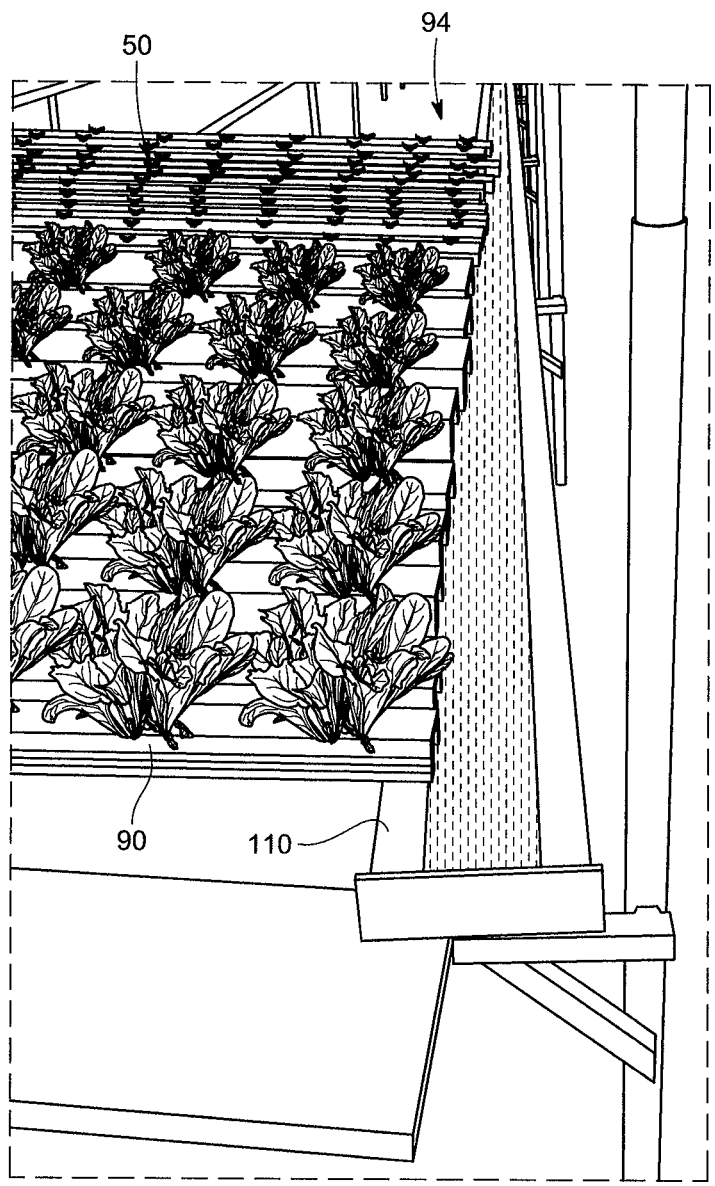
FIG. 18 shows a return water channel for the hydroponic system shown in FIGS. 16 and 17.

Referring to FIG. 18, in one embodiment, the hydroponic system 50 preferably includes a return water channel 110 or return water trough located at the distal ends 94 of the gutters 90. In one embodiment, after the water flows from the proximal ends to the distal ends 94 of the gutters 90, the water that exits the distal ends of the gutters is collected by the return water channel 110 for being re-circulated through the system. In one embodiment, the return water channel 110 preferably includes a drain opening (not shown) that directs the water back to a holding tank 112 (FIG. 19) for re-use and/or recirculation.

Figure 19:
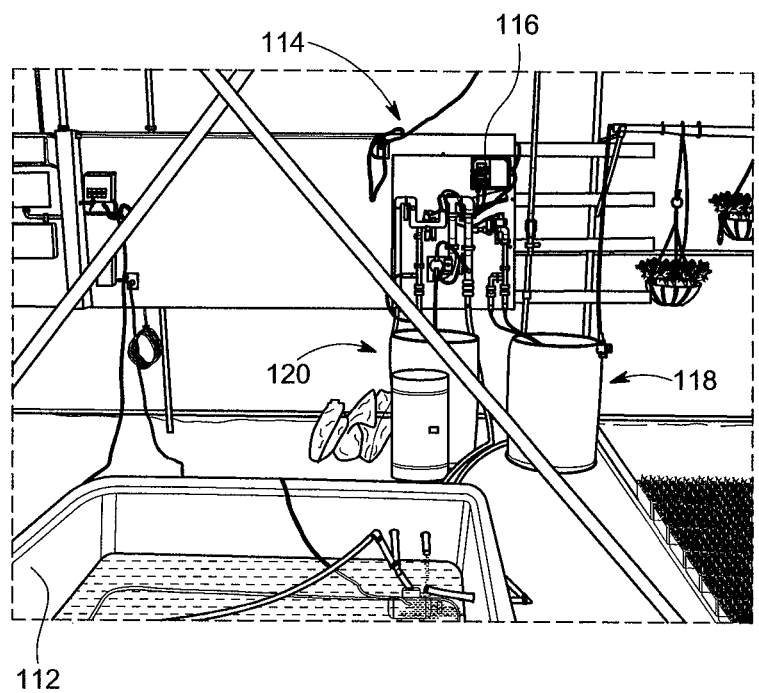
FIG. 19 shows a hydroponic control system including a control panel, a holding tank, a fertilizer barrel and an acid barrel, in accordance with one embodiment of the present invention.
Figure 20:
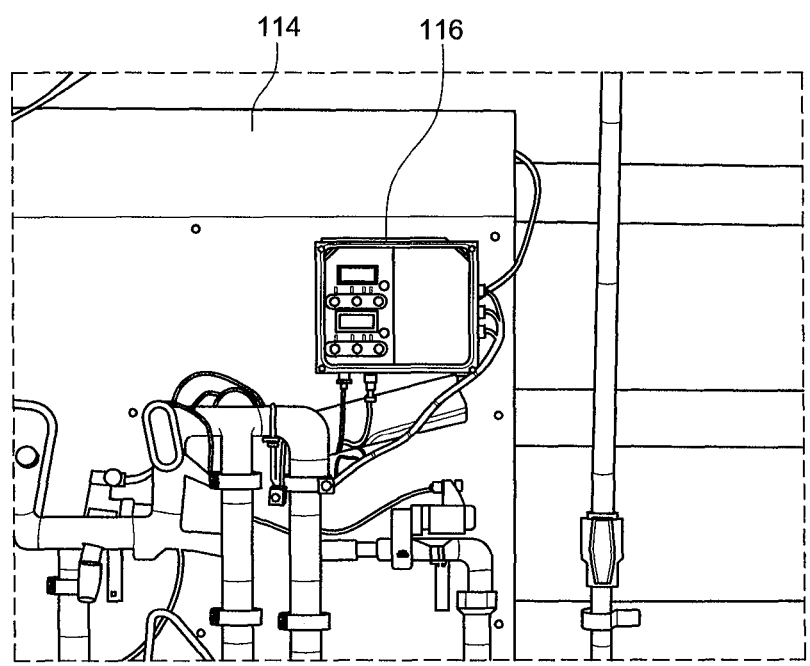
FIG. 20 shows a magnified view of the control panel of FIG. 19.

Referring to FIG. 19, in one embodiment, the hydroponic system 50 desirably includes a holding tank 112 that contains water that is received from the return water channel 110 and that is introduced into the system via a water inlet line. Referring to FIGS. 19 and 20, in one embodiment, the hydroponic system desirably includes a control panel 114 having a controller 116 for controlling operation of the system. The hydroponic system preferably includes a fertilizer mixture container 118 for controlling the amount of fertilizer introduced into the water, and an acid mixture container 120 for controlling the pH level of the water. The system preferably includes one or more fluid pumps for circulating the water through the system. The pumps may be controlled by the controller 116.

Figure 21:
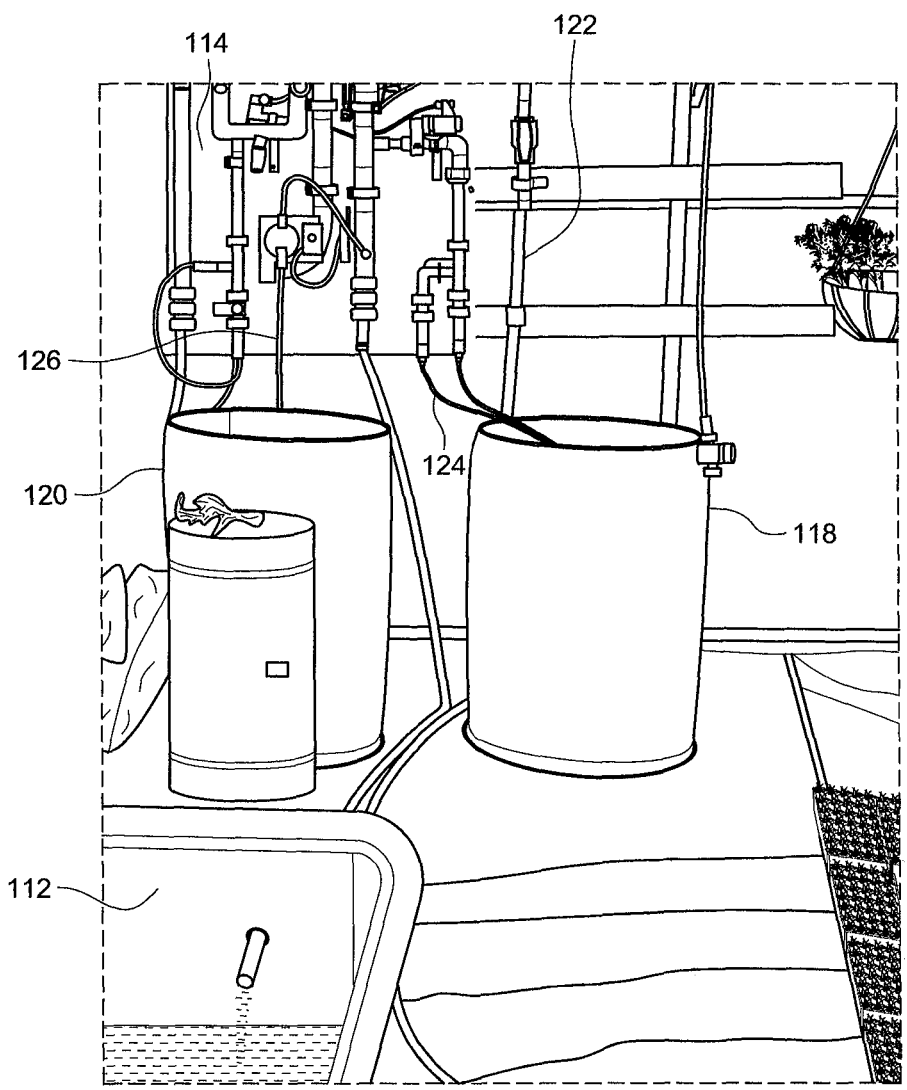
FIG. 21 shows a magnified view of the fertilizer barrel and the acid barrel of FIG. 19.

Referring to FIG. 21, in one embodiment, the hydroponic system 50 preferably includes the fertilizer container 118 that contains a mixture of fertilizer for providing nutrients to the plants. The acid container 120 preferably contains a phosphoric food grade acid for controlling the pH level of the water so as to provide an optimum pH level for the water that is responsive to the amount of fertilizer in the water. In one embodiment, it is desirable to have a pH level of about 5.7-5.8 for maximizing the ability of the plants to use all of the fertilizer present in water so as to help the plants to grow faster. The level of the fertilizer in the water and the pH level of the water may be monitored by the control system and modified by the control system in response to growing conditions such as sunlight, time of year, ambient temperature, etc. In one embodiment, in colder ambient conditions the plants grow slower and fertilizer is added to the water to make the plants grow faster. In response, the pH level is controlled to optimize the ability of the plants to use the higher levels of fertilizer present in the water. In one embodiment, the hydroponic system preferably includes a fresh water inlet line in communication with the holding tank for adding additional water to the system, as necessary. The control system may monitor and control the fertilizer level and pH level of the water after additional fresh water has been added to the system.

In one embodiment, the system 50 preferably includes a fertilizer inlet line 124 for drawing fertilizer into the system from the fertilizer container 118. The system preferably includes an acid inlet line 126 for drawing acid into the system from the acid container 120 so as to control the pH level of the water in the system. The controller 116 (FIG. 19) on the control panel 114 preferably monitors the fertilizer level and the pH level and makes adjustments as necessary to optimize growing of the plants. Water is added to the system through the fresh water line 122 as necessary.

Figure 22:
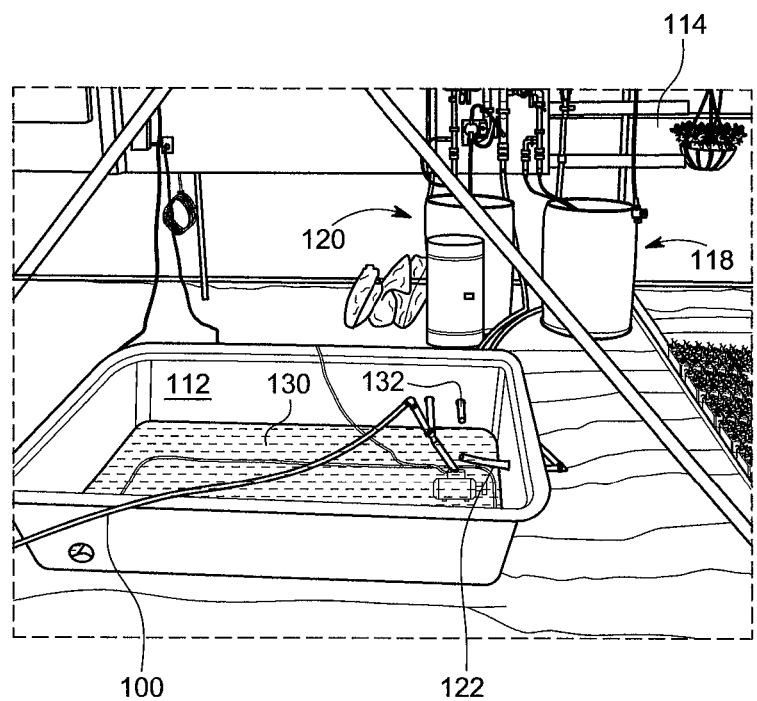
FIG. 22 shows the fertilizer barrel, the acid and the holding tank of FIG. 19.

Referring to FIG. 22, in one embodiment, the hydroponic system 50 preferably includes the main water line 100 that draws water from the holding tank 112 and provides the water to the proximal ends of the gutters 90 (FIG. 14). A pump 130 is located inside the holding tank 112 and below the water line for pumping the water through the main water line 100. The fresh water line 122, which is used to add water to the system (if necessary), has a distal end that is located inside the holding tank 112. The system 50 desirably includes a treated water line 132 that returns water to the holding tank after the fertilizer and pH levels have been adjusted by the controller. In one embodiment, the controller continuously monitors and adjusts the fertilizer and pH levels to provide a source of water for the plants that optimizes plant growth.

Figure 23:
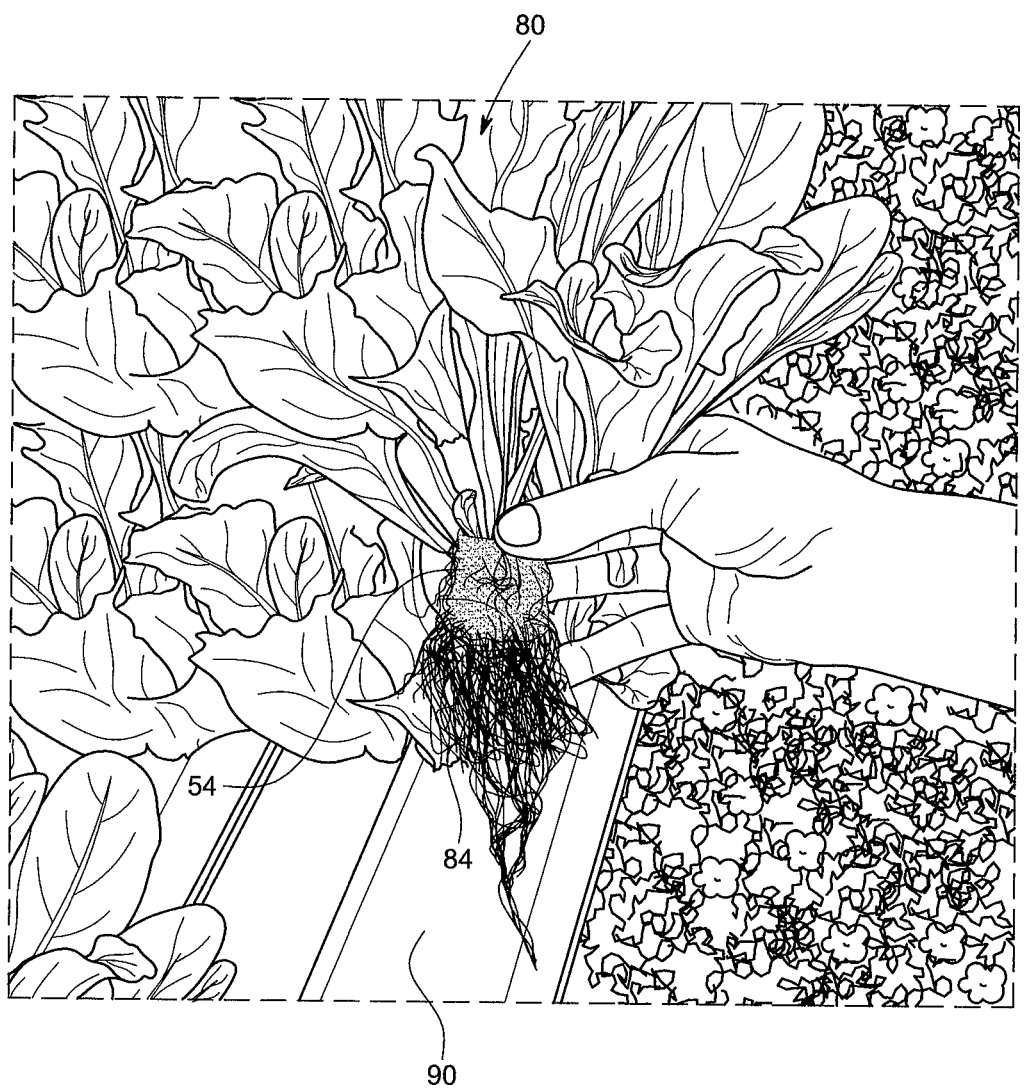
FIG. 23 shows a fully grown plant being removed from a gutter of a hydroponic system, in accordance with one embodiment of the present invention.

FIG. 23 shows a fully grown, ready-to-sell plant 80 as it is being removed from a plant openings on a gutter 90. The fully grown plant 80 includes leaves and roots 84 projecting from the sides and the bottom of the seed cube 54. As the plant is being removed from the hydroponic system, the roots 84 are not removed from the plant 80 but remain in place as the plant is packaged and shipped to a retail establishment.

Figure 24:
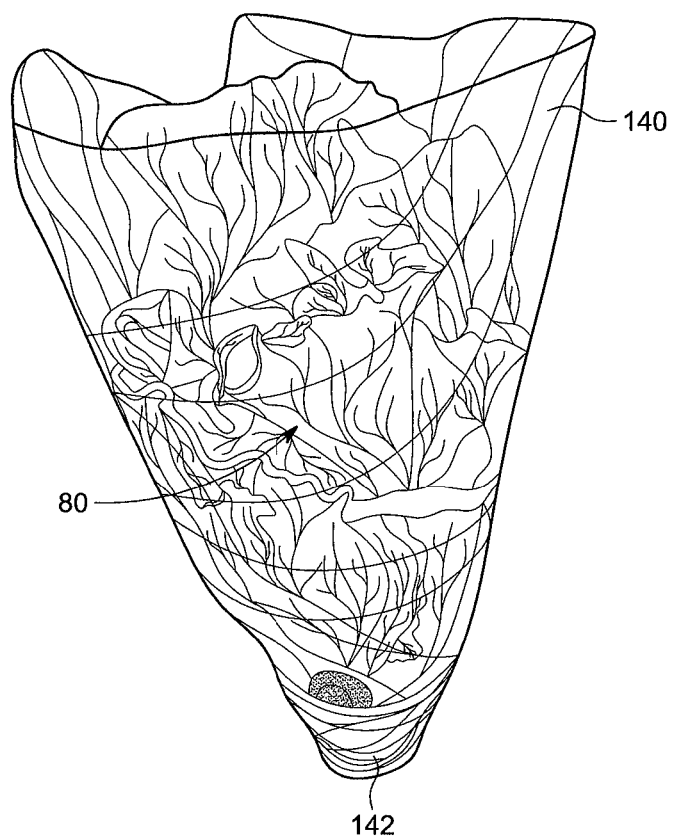
FIG. 24 shows the fully grown plant of FIG. 23 after being placed in a package having a fluid reservoir, in accordance with one embodiment of the present invention.

Referring to FIG. 24, after being removed from the gutter of the hydroponic system, the plant 80 is preferably placed inside a package 140 having has a water reservoir 142 located at the bottom of the package 140 so that the plant roots 84 (FIG. 23) may continue to draw water into the plant 80 even after the plant has been placed inside the package 140 for shipment to a retail establishment.

Figure 25:
FIG. 25 shows a fully grown plant that has been grown using hydroponics, in accordance with another embodiment of the present invention.

FIG. 25 shows another fully grown, live plant 180 having seven different types of lettuce leaves. The roots are preferably not cut but are left in place so that the plant continues to draw water into the plant during shipment to a retail establishment.

While the foregoing is directed to embodiments of the present invention, other and further embodiments of the invention may be devised without departing from the basic scope thereof, which is only limited by the scope of the claims that follow. For example, the present invention contemplates that any of the features shown in any of the embodiments described herein, or incorporated by reference herein, may be incorporated with any of the features shown in any of the other embodiments described herein, or incorporated by reference herein, and still fall within the scope of the present invention.

What is claimed is:

1. A method of providing packaged, live produce comprising:

providing a hydroponic system including a water source for providing water to said hydroponic system, a fertilizer source for dispensing fertilizer into said water, an acid source for controlling the pH level of said water, and a controller for monitoring the level of said fertilizer in said water and adjusting the pH level of said water;

providing at least five seeds, each seed being of a different plant species;

providing a foam growing media comprising a foam mat having an array of seeding cubes that are separated from one another by score lines that define thinner sections of said foam mat, wherein each said seeding cube has a top surface with a blind opening formed in said top surface;

inserting said at least five seeds into each said blind opening of each said seeding cube of said foam growing media so that said seeds fall into bottoms of said respective blind openings, wherein each blind opening receives at least five different plant species;

spraying a solution including water and nutrients over a top surface of said foam mat, wherein said seeds in the bottoms of said respective blind openings receive the water and the nutrients from the foam growing media that surrounds said seeds;

with said array of seeding cubes remaining joined together on said foam mat, growing said seeds inserted into each said blind opening of each said seeding cube of said foam growing media for about two weeks to provide a young rooted plant in each said seeding cube comprising said different plant species;

after the growing step, separating said seeding cubes containing said young rooted plants from one another at said score lines of said foam mat, wherein each said young rooted plant comprises leaves of each of said different plant species;

transferring said separated seeding cubes containing said young rooted plants to said hydroponic system for producing fully grown plants, each said fully grown plant having roots projecting from said separated seeding cube associated therewith;

while leaving said roots of each said fully grown plant projecting from said separated seeding cube associated therewith, removing said fully grown plant from said hydroponic system and placing said fully grown plant in a package having a fluid reservoir, wherein said roots of said fully grown plant are in communication with said fluid reservoir after being placed in said package.

2. The method as claimed in claim 1, wherein said at least five different types of seeds are selected from the group consisting of green leaf lettuce seeds, red leaf lettuce seeds, red oak leaf lettuce seeds, Bibb lettuce seeds, green oak leaf lettuce seeds, romaine lettuce seeds, Jericho lettuce seeds, and outrageous red romaine lettuce seeds.

3. The method as claimed in claim 1, wherein said foam growing media comprises low density, high-drainage foam growing media.

4. The method as claimed in claim 3, wherein said foam growing media comprises a foam mat having said array of seeding cubes.

5. The method as claimed in claim 4, wherein said foam mat comprises 50-300 of said seeding cubes that are separated from one another by said score lines.

6. The method as claimed in claim 1, wherein said hydroponic system is configured to measure the level of said fertilizer in said water, and wherein said controller is configured to adjust the level of said fertilizer in said water in response to the measured level of said fertilizer in said water.

7. The method as claimed in claim 1, wherein the providing at least five different types of seeds of different plant species comprises providing seven different types of seeds of different plant species, and wherein the inserting at least one of each type of said seeds step comprises inserting at least one of each of said seven types of seeds of said different plant species into each said blind opening of each said seeding cube of said foam growing media, wherein the inserting step comprises using a hand-held seeding tool having a vibrating seed trough for advancing individual seeds toward a distal end of said vibrating seed trough so that said seeds fall from the distal end of said vibrating seed trough into bottoms of said respective blind openings.

8. The method as claimed in claim 7, wherein said seven different types of seeds consist of green leaf lettuce seeds, red leaf lettuce seeds, red oak lettuce seeds, Bibb lettuce seeds, green oak leaf lettuce seeds, Jericho lettuce seeds, and outrageous red Romaine lettuce seeds.

9. The method as claimed in claim 1, further comprising providing a tray, wherein said foam mat has a top surface and a bottom surface opposite the top surface that is supported by said tray for providing stability for said foam mat.

10. The method as claimed in claim 1, further comprising watering said foam mat two times per day.

11. A method of providing packaged, live produce comprising:
    providing a hydroponic system including a water source for providing water to said hydroponic system, a fertilizer source for dispensing fertilizer into said water, an acid source for controlling the pH level of said water, and a controller for monitoring the level of said fertilizer in said water and adjusting the pH level of said water;
    providing seven different types of seeds of different plant species;
    providing a foam growing media comprising a foam mat having an array of seeding cubes that are separated from one another by score lines that define thinner sections of said foam mat, wherein each said seeding cube has a top surface with a blind opening formed in said top surface;
    inserting said seven different types of seeds into each said blind opening of each said seeding cube of said foam growing media, wherein each blind opening receives seven different plant species; using a hand-held seeding tool having a vibrating seed trough, wherein said vibrating seed trough advances said seeds toward a distal end of said vibrating seed trough for falling from the distal end of said vibrating seed trough into bottoms of said respective blind openings during the inserting step;
    with said array of seeding cubes remaining joined together on said foam mat, growing said seeds inserted into each said blind opening of each said seeding cube of said foam growing media for about two weeks to provide a young rooted plant in each said seeding cube comprising leaves of each said different plant species;
    after the growing step, separating said seeding cubes containing said young rooted plants from one another at said score lines of said foam mat, wherein each said young rooted plant comprises leaves of each of said different plant species;
    transferring said separated seeding cubes containing said young rooted plants to said hydroponic system for producing fully grown plants, each said fully grown plant having roots projecting from said separated seeding cube associated therewith;
    while leaving said roots of each said fully grown plant projecting from said separated seeding cube associated therewith, removing said fully grown plant from said hydroponic system and placing said fully grown plant in a package having a fluid reservoir, wherein said roots of said fully grown plant are in communication with said fluid reservoir after being placed in said package.

12. The method as claimed in claim 11, wherein said seven different types of seeds of said different plant species are selected from the group consisting of green leaf lettuce seeds, red leaf lettuce seeds, red oak leaf lettuce seeds, Bibb lettuce seeds, green oak leaf lettuce seeds, romaine lettuce seeds, Jericho lettuce seeds, and outrageous red romaine lettuce seeds.

13. The method as claimed in claim 11, wherein said foam growing media comprises low density, high-drainage foam growing media.

14. The method as claimed in claim 13, wherein said foam growing media comprises a foam mat having an said array of seeding cubes.

15. The method as claimed in claim 14, wherein said foam mat comprises 50-300 of said seeding cubes that are separated from one another by said score lines.

16. The method as claimed in claim 11, wherein said hydroponic system measures the level of said fertilizer in said water, and wherein said controller adjusts the level of said fertilizer in said water in response to the measured level of said fertilizer in said water.

17. The method as claimed in claim 11, further comprising before the inserting at least one of each type of said seven different types of seeds of said different plant species step, spraying a solution including water and nutrients over a top surface of said foam mat, wherein after the inserting step said seeds in the bottoms of said respective blind openings receive the water and the nutrients from said foam growing media that surrounds said seeds.

18. The method as claimed in claim 11, further comprising after the inserting at least one of each type of said seven different types of seeds of said different plant species step, spraying a solution including water and nutrients over a top surface of said foam mat, wherein said seeds in the bottoms of said respective blind openings receive the water and the nutrients from said foam growing media that surrounds said seeds.

19. The method as claimed in claim 11, further comprising watering said foam mat two times per day.

20. The method as claimed in claim 11, further comprising providing a tray, wherein said foam mat has a top surface and a bottom surface opposite the top surface that is supported by said tray for providing stability for said foam mat.

* * * * *